(12) United States Patent
Wada

(10) Patent No.: US 8,394,479 B2
(45) Date of Patent: Mar. 12, 2013

(54) WRITE-ONCE OPTICAL RECORDING MEDIUM AND PROCESS FOR MANUFACTURING THE SAME

(75) Inventor: Yutaka Wada, Miyagi (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 12/677,684

(22) PCT Filed: Nov. 25, 2008

(86) PCT No.: PCT/JP2008/071758
§ 371 (c)(1),
(2), (4) Date: Mar. 11, 2010

(87) PCT Pub. No.: WO2009/069795
PCT Pub. Date: Jun. 4, 2009

(65) Prior Publication Data
US 2010/0187099 A1     Jul. 29, 2010

(30) Foreign Application Priority Data
Nov. 27, 2007    (JP) ............................... P2007-306540

(51) Int. Cl.
*B32B 3/02*    (2006.01)
(52) U.S. Cl. ............... 428/64.1; 428/64.4; 428/64.5; 430/270.13
(58) Field of Classification Search ............. 428/64.4, 428/64.5, 64.6
See application file for complete search history.

(56) References Cited

U.S. PATENT DOCUMENTS

| | | | |
|---|---|---|---|
| 6,605,330 B2 * | 8/2003 | Tyan et al. | 428/64.1 |
| 6,610,380 B2 * | 8/2003 | Kitaura et al. | 428/64.1 |
| 6,938,267 B2 | 8/2005 | Kikuchi et al. | |
| 7,952,985 B2 * | 5/2011 | Suwabe et al. | 369/275.4 |
| 2003/0099805 A1 | 5/2003 | Tyan et al. | |
| 2004/0145999 A1 | 7/2004 | Kurokawa et al. | |
| 2005/0003134 A1 | 1/2005 | Rijpers et al. | |
| 2008/0253272 A1 * | 10/2008 | Zhou et al. | 369/283 |

FOREIGN PATENT DOCUMENTS

| | | |
|---|---|---|
| EP | 1310953 A2 | 5/2003 |
| EP | 1845526 A2 | 10/2007 |
| JP | 05-101442 | 4/1993 |
| JP | 05-208559 | 8/1993 |
| JP | 09-115180 | 5/1997 |

(Continued)

OTHER PUBLICATIONS

International Search Report dated Feb. 19, 2009, for corresponding Patent Application PCT/JP2008/071758.

(Continued)

*Primary Examiner* — Elizabeth Mulvaney
(74) *Attorney, Agent, or Firm* — K&L Gates LLP

(57) ABSTRACT

A write-once optical recording medium includes an inorganic recording layer and a protective layer provided on at least one surface of the inorganic recording layer. This protective layer contains indium oxide and tin oxide as main components.

8 Claims, 12 Drawing Sheets

FOREIGN PATENT DOCUMENTS

| | | |
|---|---|---|
| JP | 2002-269825 | 9/2002 |
| JP | 2002-269826 | 9/2002 |
| JP | 2003-059106 | 2/2003 |
| JP | 2003-182237 | 7/2003 |
| JP | 2005-115978 | 4/2005 |
| JP | 2005-510002 | 4/2005 |
| JP | 2005-267832 | 9/2005 |
| JP | 2006-092605 | 4/2006 |
| JP | 2007-080389 | 3/2007 |
| JP | 2007-168315 | 7/2007 |
| JP | 2008-234752 | 10/2008 |
| WO | 03/67582 | 8/2003 |

OTHER PUBLICATIONS

European Search Report issued Feb. 3, 2012, for corresponding European Appln. No. 08855095.9.

Japanese Office Action issued Mar. 6, 2012, for corresponding Japanese Appln. No. 2007-306540.

Communication pursuant to Article 94(3) EPC issued Jul. 23, 2012 in EP Application No. 08 855 095.9-1214.

Japanese Office Action issued Aug. 7, 2012, for corresponding Japanese Appln. No. 2007-306540.

* cited by examiner

WRITE-ONCE OPTICAL RECORDING MEDIUM AND PROCESS FOR MANUFACTURING THE SAME

CROSS REFERENCE TO RELATED APPLICATIONS

The present application is a National Stage of International Application No. PCT/JP2008/071758 filed on Nov. 25, 2008 and which claims priority to Japanese Patent Application No. 2007-306540 filed on Nov. 27, 2007, the entire contents of which are being incorporated herein by reference.

BACKGROUND

The present disclosure relates to a write-once optical recording medium. Specifically, the present invention relates to a write-once optical recording medium having an inorganic recording layer and a process for manufacturing the same.

CDs (Compact Discs), DVDs (Digital Versatile Discs), and the like have led the market of optical recording media. However, recently, as a realization of high-vision televisions and a rapid increase in the volume of data handled by PCs (personal computers), it has been desired that optical recording media have a larger capacity. In order to meet this requirement, optical recording media for a blue laser, such as BDs (Blu-ray discs (registered trademark)) and HD-DVDs (Heigh-Definition Digital Versatile Discs) have appeared, and a new market of optical recording media having a large capacity has been established.

Recordable optical recording media include rewritable optical recording media represented by a CD-RW (Compact Disc-ReWritable) and a DVD±RW (Digital Versatile Disc±ReWritable), and write-once optical recording media represented by a CD-R (Compact Disc-Recordable) and a DVD-R (Digital Versatile Disc-Recordable). In particular, the latter optical recording media have made a large contribution to market expansion as low-price media. Accordingly, also in large-capacity optical recording media for a blue laser, in order to expand the market, it is believed that a reduction in the price of write-once optical recording media is necessary.

In write-once optical recording media, both inorganic materials and organic dye materials are permitted as recording materials in terms of the standard. Write-once optical recording media including an organic material are advantageous in that they can be produced by a spin-coating method at a low cost. On the other hand, write-once optical recording media including an inorganic material are advantageous in that they have good reproduction durability and push-pull signal characteristics but are disadvantageous in that a large sputtering apparatus is necessary. Accordingly, in order that write-once optical recording media including an inorganic material can be competitive with those including an organic material in terms of price, it is essential that an initial investment for a production apparatus be reduced and the takt per disc be increased to efficiently produce the recording media.

An example of the most effective means for solving the above problem is reducing the number of layers constituting a recording film to reduce the number of film deposition chambers, thus reducing the initial investment for a sputtering apparatus and reducing a production takt. However, even if the number of layers is merely reduced, when the film thickness is large and a material whose film deposition rate is low is used, the production takt increases, which may actually result in an increase in the cost.

Hitherto, as materials of protective layers of write-once optical recording media including an inorganic material, transparent dielectric materials such as SiN and ZnS—$SiO_2$ have been mainly used (refer to, for example, Japanese Unexamined Patent Application Publication No. 2003-59106). Although SiN and ZnS—$SiO_2$ are advantageous in that the film deposition rate is high and thus productivity is good, they have a problem that a storage characteristic (storage reliability) of recorded data is poor. Among dielectric materials other than those mentioned above, there are dielectric materials that have high storage reliability. However, it is necessary to deposit these materials by radio-frequency (RF) sputtering, and thus there is a problem that the film deposition rate is very low and productivity is low. Accordingly, it is very difficult to satisfy both storage reliability and productivity.

SUMMARY

An object is to provide a write-once optical recording medium having good storage reliability and productivity, and a process for manufacturing the same.

By using a material containing, as main components, indium oxide and tin oxide as a material of a protective layer, high storage reliability can be realized and high productivity can be obtained.

In order to solve the above problem, a first embodiment is a write-once optical recording medium including:
an inorganic recording layer; and
a protective layer containing indium oxide and tin oxide as main components, the protective layer being provided on at least one surface of the inorganic recording layer.

A second embodiment is a write-once optical recording medium at least including:
a first recording layer and a second recording layer,
wherein the second recording layer includes
an inorganic recording layer, and
a protective layer containing indium oxide and tin oxide as main components, the protective layer being provided on at least one surface of the inorganic recording layer, and
recording and/or reproduction of an information signal to and/or from the first recording layer is performed by irradiating the first recording layer with a laser beam through the second recording layer.

A third embodiment is a process for manufacturing a write-once optical recording medium including:
a step of forming an inorganic recording layer; and
a step of forming a protective layer containing indium oxide and tin oxide as main components,
wherein the protective layer is provided on at least one surface of the inorganic recording layer.

In the embodiments, since a protective layer containing indium oxide and tin oxide as main components is provided at least one surface of an inorganic recording layer, good storage reliability can be obtained. Furthermore, the material containing indium oxide and tin oxide as main components has high electrical conductivity, and thus a film deposition can be performed by a direct-current (DC) sputtering method and the film deposition rate is high. Consequently, productivity can be improved.

According to the present embodiments, both storage reliability and high productivity can be satisfied.

Additional features and advantages are described herein, and will be apparent from, the following Detailed Description and the figures.

DETAILED DESCRIPTION

Embodiments will now be described with reference to the drawings.

(1) First Embodiment (1-1) Configuration of Write-Once Optical Recording Medium

Figure 1:
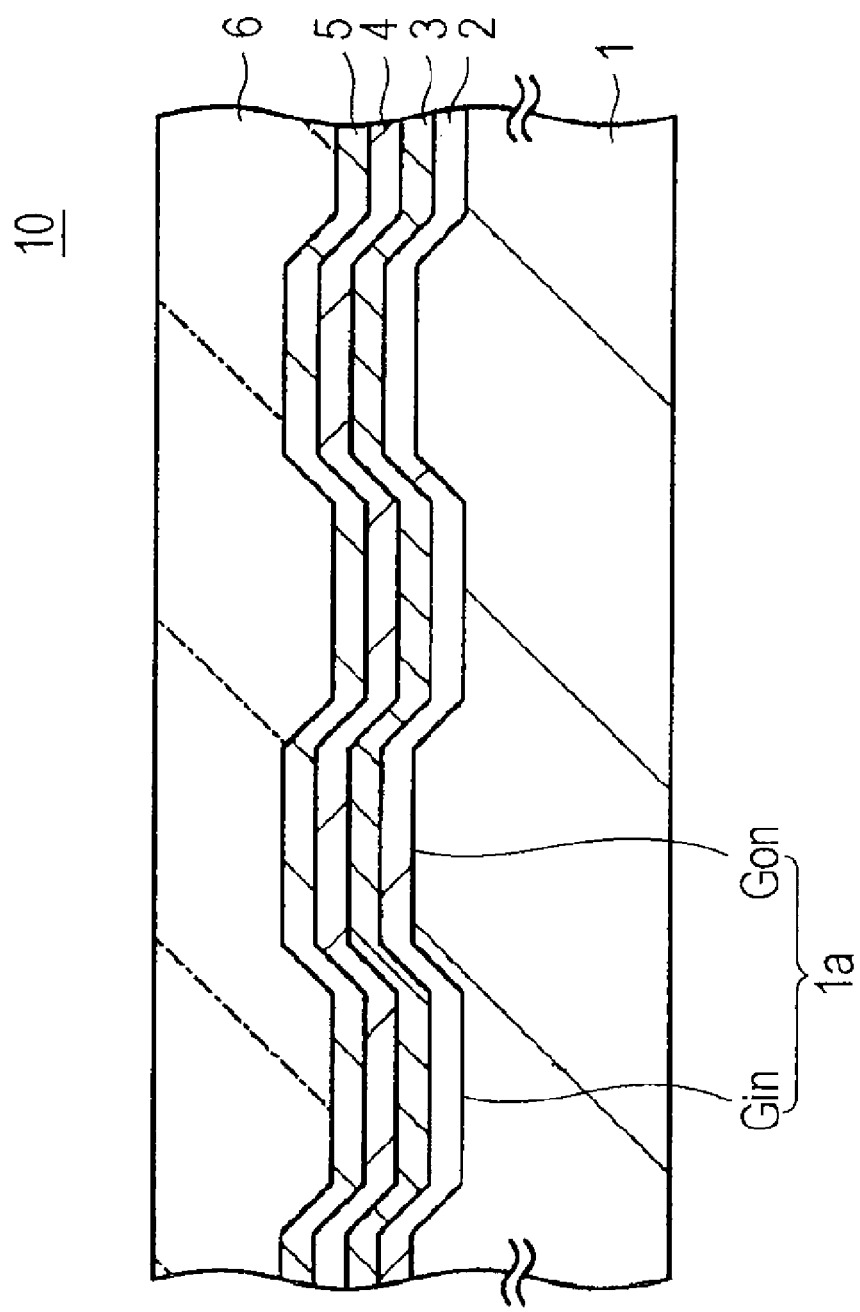
FIG. 1 is a schematic cross-sectional view showing a configuration example of a write-once optical recording medium according to a first embodiment

FIG. 1 is a schematic cross-sectional view showing a configuration example of a write-once optical recording medium according to a first embodiment. This write-once optical recording medium 10 has a configuration in which a reflective layer 2, a first protective layer 3, an inorganic recording layer 4, a second protective layer 5, and a light-transmissive layer 6 are sequentially laminated on a substrate 1.

In this write-once optical recording medium 10 according to the first embodiment, by irradiating the inorganic recording layer 4 with a laser beam from the light-transmissive layer 6 side, recording or reproduction of an information signal is performed. For example, by condensing a laser beam having a wavelength in the range of 400 nm or more and 410 nm or less with an objective lens having a numerical aperture in the range of 0.84 or more and 0.86 or less and irradiating the inorganic recording layer 4 from the light-transmissive layer 6 side, recording or reproduction of an information signal is performed. An example of such a write-once optical recording medium 10 is BD-R.

The substrate 1, the reflective layer 2, the first protective layer 3, the inorganic recording layer 4, the second protective layer 5, and the light-transmissive layer 6, all of which constitute the write-once optical recording medium 10 will be described in order below.

(Substrate)

The substrate 1 has, for example, an annular shape in which an opening (hereinafter referred to as "center hole") is provided at the center. A main surface of this substrate 1 constitutes, for example, a projecting and recessed surface 1a, and the inorganic recording layer 4 is deposited above this projecting and recessed surface 1a. Hereinafter, on the projecting and recessed surface 1a, a recessed portion is referred to as "in-groove Gin" and a projecting portion is referred to as "on-groove Gon".

Examples of the shape of the in-groove Gin and the on-groove Gon include various types of shapes such as a spiral shape and a concentric circular shape. In addition, the in-groove Gin and/or on-groove Gon is wobbled (meandered) in order to, for example, add address information.

The diameter of the substrate 1 is selected to be, for example, 120 mm. The thickness of the substrate 1 is selected in consideration of the rigidity, and is selected to be, preferably in the range of 0.3 mm to 1.3 mm, more preferably in the range of 0.6 mm to 1.3 mm, and, for example, 1.1 mm. Furthermore, the diameter of the center hole is selected to be, for example, 15 mm.

As the material of the substrate 1, for example, a plastic material or glass can be used. From the standpoint of the cost, a plastic material is preferably used. As the plastic material, for example, a polycarbonate resin, a polyolefin resin, an acrylic resin, or the like can be used.

(Reflective Layer)

As the material of the reflective layer 2, a metal, a semi-metal, or the like that can be typically used in conventional, known optical discs, for example, a Ag alloy, an Al alloy, or the like can be optionally selected and used in accordance with characteristics desired for the reflective layer 2. Furthermore, as the material of the reflective layer 2, a material having a heat sink (heat dissipation) capacity in addition to a light-reflecting capacity is desirably used. In such a case, a function as a heat dissipation layer can also be provided to the reflective layer 2.

(First Protective Layer and Second Protective Layer)

The first protective layer 3 and the second protective layer 5 are layers for protecting the inorganic recording layer 4 and controlling optical characteristics and heat characteristics during recording/reproduction. At least one of the first protective layer 3 and the second protective layer 5 contains an oxide of indium and tin (indium tin oxide, hereinafter referred to as "ITO") as a main component. This configuration can satisfy both storage reliability and high productivity. In particular, both the first protective layer 3 and the second protective layer 5 preferably contain ITO as a main component. This is because the storage reliability can be further improved. As materials other than ITO, dielectric materials that can be typically used in conventional, known optical discs, such as SiN, ZnS—$SiO_2$, and $Ta_2O_5$ can be used. The thickness of the first protective layer 3 is preferably 10 nm to 40 nm, and more preferably, 20 nm to 30 nm in order to obtain an appropriate reflectivity. The thickness of the second protective layer 5 is preferably 11 nm to 34 nm, and more preferably 16 nm to 30 nm from the standpoint of an improvement in a recording power margin.

(Inorganic Recording Layer)

The inorganic recording layer 4 is a write-once inorganic recording layer. This inorganic recording layer 4 contains, for example, ZnS, $SiO_2$, and Sb as main components, further contains at least one element selected from the group consisting of Zn, Ga, Te, V, Si, Ta, Ge, In, Cr, Sn, and Tb according to need, and preferably has a composition represented by formula (1) below:

$$[(ZnS)_x(SiO_2)_{1-x}]_y(Sb_zX_{1-z})_{1-y} \quad (1)$$

wherein $0 < x \leq 1.0$, $0.3 \leq y \leq 0.7$, and $0.8 < z \leq 1.0$, and X is at least one element selected from the group consisting of Ga, Te, V, Si, Zn, Ta, Ge, In, Cr, Sn, and Tb.

In addition, the thickness of the inorganic recording layer 4 is preferably 3 nm to 40 nm from the standpoint that suitable recording and reproducing characteristics are obtained.

In the inorganic recording layer 4 containing ZnS, SiO$_2$, and Sb as main components, the ZnS, SiO$_2$, and Sb are in an amorphous state before recording. When the inorganic recording layer 4 in such a state is irradiated with a laser beam, crystals of Sb are formed in a central portion of the inorganic recording layer 4 and other atoms concentrate in the vicinity of an interface. Consequently, optical constants (n: refractive index, k: extinction coefficient) are changed to record an information signal. It is difficult to return the inorganic recording layer 4 in a state in which crystals of Sb are thus formed in the central portion to the amorphous state before recording. Therefore, the inorganic recording layer described above is used as a write-once inorganic recording layer.

In this manner, when the inorganic recording layer 4 contains ZnS, SiO$_2$, and Sb as main components and preferably has a composition represented by formula (1) above, recorded information is stably stored for a long period of time in the initial state, signals are not impaired by a laser beam for reproduction during the reproduction of the signals, the quality of the inorganic recording layer 4 is not changed in ordinary long-term storage and therefore writing characteristics are maintained, and a sufficient sensitivity and reaction rate can be obtained for a laser beam for recording and/or reproduction. Accordingly, suitable recording and reproducing characteristics can be obtained over wide ranges of linear velocity and recording power.

The material of the inorganic recording layer 4 is not limited to the material described above. Inorganic recording materials that can be typically used in conventional, known write-once optical recording media can also be used.

For example, as the inorganic recording layer 4, for example, a phase-change-type inorganic recording layer containing Te, Pd, and O (oxygen) as main components can be used, and this inorganic recording layer has, for example, a composition represented by formula (2) below:

$$(Te_xPd_{1-x})_yO_{1-y} \qquad (2)$$

wherein $0.7 \leq x \leq 0.9$ and $0.3 \leq y \leq 0.7$.

Alternatively, as the inorganic recording layer 4, for example, an alloy-type inorganic recording layer in which a silicon (Si) film and a copper (Cu) alloy film are laminated, or an inorganic recording layer containing Ge, Bi, and N as main components can also be used.

(Light-Transmissive Layer)

The light-transmissive layer 6 includes, for example, a light-transmissive sheet having an annular shape and an adhesive layer for bonding this light-transmissive sheet to the substrate 1. The light-transmissive sheet is preferably composed of a material having a low absorptivity of a laser beam used in recording and/or reproduction, and specifically, preferably composed of a material having a transmittance of 90 percent or more. Examples of the material of the light-transmissive sheet include polycarbonate resin materials and polyolefin-based resins (for example, ZEONEX (registered trademark)). The thickness of the light-transmissive sheet is preferably selected to be 0.3 mm or less, and more preferably, selected from the range of 3 μm to 177 μm. The adhesive layer is composed of, for example, an ultraviolet-curable resin or a pressure-sensitive adhesive (PSA). Alternatively, the light-transmissive layer 6 may be constituted by a resin cover formed by curing a photosensitive resin such as a UV resin. An example of the material of the resin cover is an ultraviolet-curable acrylic resin.

The thickness of the light-transmissive layer 6 is preferably selected from the range of 10 μm to 177 μm, and selected to be, for example, 100 μm. By combining such a thin light-transmissive layer 6 with an objective lens having a high NA (numerical aperture) of, for example, about 0.85, a high-density recording can be realized.

(1-2) Process for Manufacturing Write-Once Optical Recording Medium

Next, an example of a process for manufacturing a write-once optical recording medium according to the first embodiment of the present invention will be described.

(Step of Forming Substrate)

First, a substrate 1 a main surface of which has a projecting and recessed surface 1a is formed. As a method of forming the substrate 1, for example, an injection molding (injection) method, a photopolymer method (2P method: photo-polymerization), or the like can be employed.

(Step of Depositing Reflective Layer)

Next, the substrate 1 is transferred to a vacuum chamber equipped with a target containing, for example, a Ag alloy or an Al alloy as a main component, the vacuum chamber is evacuated until the pressure in the vacuum chamber reaches a predetermined value. Subsequently, the target is sputtered while introducing a process gas such as Ar gas in the vacuum chamber to deposit a reflective layer 2 on the substrate 1.

(Step of Depositing First Protective Layer)

Next, the substrate 1 is transferred to a vacuum chamber equipped with a target containing, for example, ITO as a main component, and the vacuum chamber is evacuated until the pressure in the vacuum chamber reaches a predetermined value. Subsequently, the target is sputtered while introducing a process gas such as Ar gas or O$_2$ in the vacuum chamber to deposit a first protective layer 3 on the reflective layer 2. As a sputtering method, for example, a radio-frequency (RF) sputtering method or a direct-current (DC) sputtering method can be employed, but the direct-current sputtering method is particularly preferable. This is because since the film deposition rate in the direct-current sputtering method is higher than that in the radio-frequency sputtering method, productivity can be improved.

(Step of Depositing Inorganic Recording Layer)

Next, the substrate 1 is transferred to a vacuum chamber equipped with a target containing, for example, ZnS, SiO$_2$, and Sb as main components, and the vacuum chamber is evacuated until the pressure in the vacuum chamber reaches a predetermined value. Subsequently, the target is sputtered while introducing a process gas such as Ar gas in the vacuum chamber to deposit an inorganic recording layer 4 on the first protective layer 3.

(Step of Depositing Second Protective Layer)

Next, the substrate 1 is transferred to a vacuum chamber equipped with a target containing, for example, ITO as a main component, and the vacuum chamber is evacuated until the pressure in the vacuum chamber reaches a predetermined value. Subsequently, the target is sputtered while introducing a process gas such as Ar gas or O$_2$ in the vacuum chamber to deposit a second protective layer 5 on the inorganic recording layer 4. As a sputtering method, for example, a radio-frequency (RF) sputtering method or a direct-current (DC) sputtering method can be employed, but the direct-current sputtering method is particularly preferable. This is because since the film deposition rate in the direct-current sputtering method is higher than that in the radio-frequency sputtering method, productivity can be improved.

(Step of Forming Light-Transmissive Layer)

Next, a light-transmissive layer 6 is formed on the second protective layer 5. As a method of forming the light-transmissive layer 6, for example, a resin coating method in which a photosensitive resin such as a UV resin is spin-coated on the second protective layer 5, and the photosensitive resin is irradiated with light such as UV light to form the light-transmissive layer 6, or a sheet bonding method in which the light-transmissive layer 6 is formed by bonding a light-transmissive sheet on the projecting and recessed surface 1a side of the substrate 1 using an adhesive can be employed. Furthermore, as this sheet bonding method, for example, a sheet-resin bonding method in which the light-transmissive layer 6 is formed by bonding a light-transmissive sheet on the projecting and recessed surface 1a side of the substrate 1 using a photosensitive resin such as a UV resin applied on the second protective layer 5 or a sheet-PSA bonding method in which the light-transmissive layer 6 is formed by bonding a light-transmissive sheet on the projecting and recessed surface 1a side of the substrate 1 using a pressure-sensitive adhesive (PSA) that has been uniformly applied on a main surface of this sheet in advance can be employed.

By the steps described above, the write-once optical recording medium 10 shown in FIG. 1 is obtained.

As described above, according to the first embodiment, since the first protective layer 3 and the second protective layer 5 are provided on the surfaces of the inorganic recording layer 4, and at least one of the first protective layer 3 and the second protective layer 5 contains ITO as a main component, high storage reliability can be obtained. In addition, by using ITO as the protective layer, the protective layer can be deposited at a high film deposition rate. Accordingly, the thickness of the protective layer that can be deposited in one chamber can be increased. As a result, the number of chambers can be reduced while maintaining the degree of freedom of a thermal design. Accordingly, the initial investment for a production apparatus can be markedly reduced, and in addition, a reduction in the price can be realized even for inorganic media by an effect of reducing the takt during production. Furthermore, a sufficient recording power margin can be also ensured for a recording at a high speed such as 6-times speed.

Furthermore, since the write-once optical recording medium 10 is produced by sequentially laminating the reflective layer 2, the first protective layer 3, the inorganic recording layer 4, and the second protective layer 5 on the substrate 1, the write-once optical recording medium 10 having high productivity and storage reliability can be produced using a film deposition apparatus having four chambers.

(2) Second Embodiment

Figure 2:
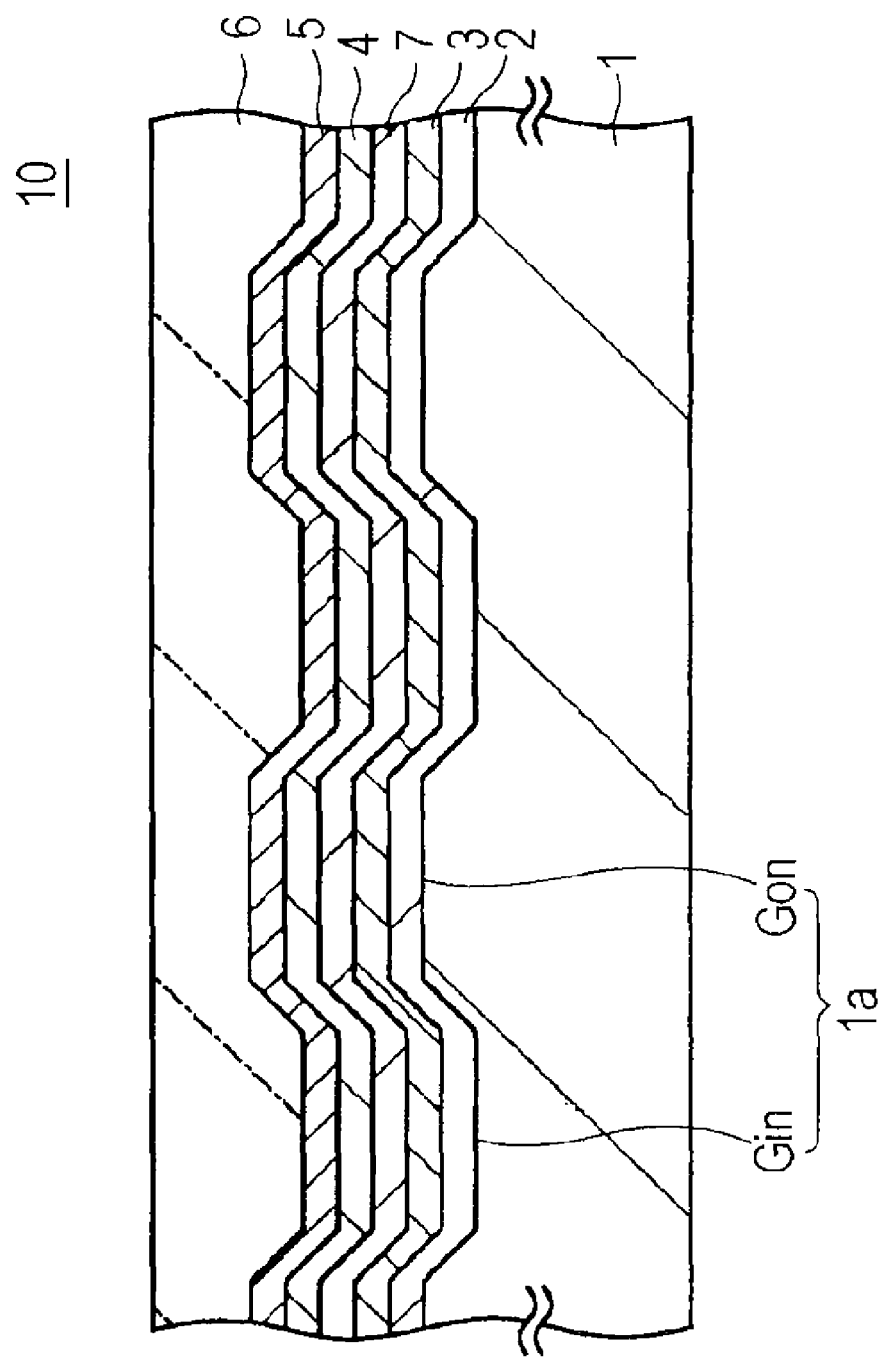
FIG. 2 is a schematic cross-sectional view showing a configuration example of a write-once optical recording medium according to a second embodiment

FIG. 2 is a schematic cross-sectional view showing a configuration example of a write-once optical recording medium according to a second embodiment. Note that the same parts as those of the write-once optical recording medium according to the first embodiment are assigned the same reference numerals, and a description of those parts is omitted. As shown in FIG. 2, a write-once optical recording medium 10 according to the second embodiment differs from the write-once optical recording medium 10 according to the first embodiment in that a heat-accumulating layer 7 is further provided between the first protective layer 3 and the inorganic recording layer 4. The heat-accumulating layer 7 contains a dielectric material, for example, $ZnS-SiO_2$ or the like as a main component. The thickness d of the second protective layer 5 is preferably 11 nm to 34 nm, and more preferably, 16 nm to 30 nm from the standpoint of an improvement in a recording power margin. When the thickness of the first protective 3 is represented by d1 and the thickness of the heat-accumulating layer 7 is represented by d2, these thicknesses d1 and d2 preferably satisfy the relationship of $0.07 \leq d2/(d1+d2) \leq 1.00$. By satisfying this relationship, the recording sensitivity can be improved. As a film deposition method of the heat-accumulating layer 7, for example, a sputtering method can be employed.

The heat-accumulating layer 7 has a thermal conductivity lower than that of the first protective layer 3. Therefore, the heat-accumulating layer 7 functions as a heat-accumulating layer that holds heat generated during recording in the inorganic recording layer 4. Accordingly, by providing the heat-accumulating layer 7 between the first protective layer 3 and the inorganic recording layer 4, heat can be effectively used and a high recording sensitivity of the write-once optical recording medium 10 can be realized. Furthermore, by temporarily accumulating heat in the inorganic recording layer 4, and then dissipating the heat from the inside of the inorganic recording layer 4 to the first protective layer 3 having a high thermal conductivity and the reflective layer 2, a clear mark edge can be formed to obtain a low jitter and a wide power margin. However, if the heat-accumulating layer 7 is too thick, and $d1/(d1+d2)>0.95$ (wherein d1 represents the thickness of the first protective layer, and d2 represents the thickness of the heat-accumulating layer), heat is excessively accumulated in the inorganic recording layer 4, and thus mark edges are not aligned and the power margin tends to decrease. Accordingly, it is preferable to satisfy $d2/(d1+d2) \leq 0.95$.

Note that the position at which the heat-accumulating layer is provided is not limited between the first protective layer 3 and the inorganic recording layer 4. For example, the heat-accumulating layer may be provided between the inorganic recording layer 4 and the second protective layer 5. Alternatively, heat-accumulating layers may be provided both between the first protective layer 3 and the inorganic recording layer 4, and between the inorganic recording layer 4 and the second protective layer 5.

In this second embodiment, since the heat-accumulating layer 7 is further provided between the first protective layer 3 and the inorganic recording layer 4, the recording sensitivity can be improved as compared with the first embodiment.

Furthermore, since the write-once optical recording medium 10 is produced by sequentially laminating the reflective layer 2, the first protective layer 3, the heat-accumulating layer 7, the inorganic recording layer 4, and the second protective layer 5 on the substrate 1, the write-once optical recording medium having high productivity and storage reliability can be produced using a film deposition apparatus having five chambers.

(3) Third Embodiment (3-1) Configuration of Write-Once Optical Recording Medium

Figure 3:
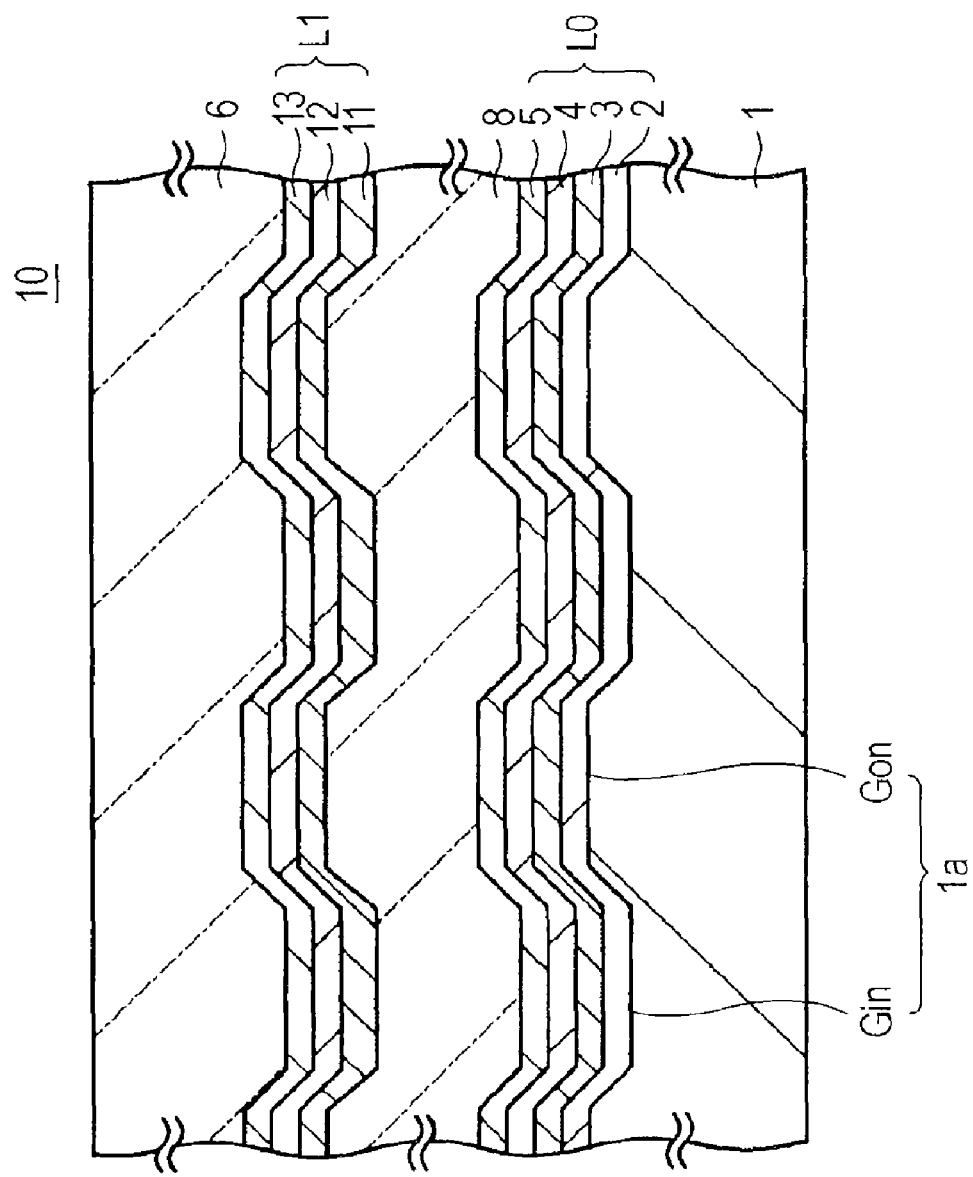
FIG. 3 is a schematic cross-sectional view showing a configuration example of a write-once optical recording medium according to a third embodiment

FIG. 3 is a schematic cross-sectional view showing a configuration example of a write-once optical recording medium according to a third embodiment. Note that the same parts as those of the write-once optical recording medium according to the first embodiment are assigned the same reference numerals, and a description of those parts is omitted. As shown in FIG. 3, this write-once optical recording medium 10 has a configuration in which a first recording layer (L0 layer) L0, an interlayer 8, a second recording layer (L1 layer) L1, and a light-transmissive layer 6 are sequentially laminated on a substrate 1. The first recording layer L0 has a configuration in which a reflective layer 2, a first protective layer 3, an inorganic recording layer 4, and a second protective layer 5 are sequentially laminated on the substrate 1. The second recording layer L1 has a configuration in which a first protective layer 11, an inorganic recording layer 12, and a second protective layer 13 are sequentially laminated on the interlayer 8.

The first protective layer 11, the inorganic recording layer 12, and the second protective layer 13 are the same as the first protective layer 3, the inorganic recording layer 4, and the second protective layer 5, respectively, in the first embodiment described above, and thus a description thereof is omitted.

The interlayer 8 is provided on a first information recording layer 5, and the thickness thereof is selected to be, for example, 25 μm. The interlayer 8 is composed of a resin material having transparency. As such a material, a plastic material, for example, a polycarbonate resin, a polyolefin resin, an acrylic resin, or the like can be used. A surface of the interlayer 8 at the light-transmissive layer 6 side constitutes a projecting and recessed surface 1a including in-grooves Gin and on-grooves Gon as in the substrate 1. The second recording layer L1 is deposited on this projecting and recessed surface 1a. Hereinafter, as in the substrate 1, in the projecting and recessed surface 1a, a recessed portion is referred to as "in-groove Gin" and a projecting portion is referred to as "on-groove Gon".

Examples of the shape of the recessed in-groove Gin and the projecting on-groove Gon include various types of shapes such as a spiral shape and a concentric circular shape. In addition, the in-groove Gin and/or on-groove Gon is wobbled (meandered) in order to, for example, add address information.

Furthermore, in the second recording layer L1, a heat-accumulating layer is preferably provided at least one between the first protective layer 11 and the inorganic recording layer 12 and between the inorganic recording layer 12 and the second protective layer 13. This is because the recording sensitivity of the second recording layer L1 can be improved. This heat-accumulating layer contains a dielectric material, for example, ZnS—SiO$_2$ or the like as a main component.

(3-2) Process for Manufacturing Write-Once Optical Recording Medium

Next, an example of a process for manufacturing a write-once optical recording medium according to the third embodiment will be described.

First, as in the first embodiment, a first recording layer L0 is formed by sequentially laminating a reflective layer 2, a first protective layer 3, an inorganic recording layer 4, and a second protective layer 5 on a substrate 1.

Next, an ultraviolet-curable resin is uniformly applied onto the first recording layer L0 by, for example, a spin-coating method. Subsequently, a projection-and-recess pattern of a stamper is pressed onto the ultraviolet-curable resin that has been uniformly applied on the substrate 1, the ultraviolet-curable resin is cured by being irradiated with ultraviolet light, and the stamper is then detached. Thus, the projection-and-recess pattern of the stamper is transferred to the ultraviolet-curable resin to form an interlayer 8 provided with in-grooves Gin and on-grooves Gon.

Next, a first protective layer 11, an inorganic recording layer 12, and a second protective layer 13 are sequentially laminated on the interlayer 8 by, for example, a sputtering method.

As described above, according to the third embodiment, also in the write-once optical recording medium 10 including the first recording layer L0 and the second recording layer L1, both storage reliability and high productivity can be satisfied. Furthermore, even though a semi-transmissive reflective film functioning as an area of heat dissipation is not provided in the second recording layer L1, high reproduction durability can be obtained.

EXAMPLES

The embodiments will be specifically described below on the basis of Examples.

In these Examples, ODU-1000 manufactured by Pulstec Industrial Co., Ltd. was used for recording and reproduction of an information signal on a write-once optical recording medium. In this evaluation device, the wavelength of a laser beam was 405 nm, the numerical aperture NA was 0.85, and a signal evaluation was performed by recording on a write-once optical recording medium at a linear velocity of 19.68 m/s, which is 4-times speed, or a linear velocity of 29.52 m/s, which is 6-times speed, in accordance with the standard of Blu-ray disc 25 GB density, and reproducing at 4.92 m/s, which is 1-time speed.

However, in an evaluation of storage reliability, a drive (BDR-101A) manufactured by Pioneer Corporation was used for recording and reproduction of an information signal on a write-once optical recording medium.

Example 1

First, a polycarbonate substrate having a thickness of 1.1 mm was formed by injection molding. Note that a projecting and recessed surface having in-grooves Gin and on-grooves Gon was formed on this polycarbonate substrate.

Next, a reflective layer, a first protective layer, a heat-accumulating layer, an inorganic recording layer, and a second protective layer were sequentially laminated on the polycarbonate substrate by a sputtering method. The specific configuration of each of the layers was as follows.

Reflective layer: Ag alloy, 80 nm
First protective layer: ITO, 13 nm
Heat-accumulating layer: ZnS—SiO$_2$, 13 nm
Inorganic recording layer: [(ZnS)$_{80}$(SiO$_2$)$_{20}$]$_{40}$Sb$_{60}$, 20 nm
Second protective layer: ITO, 20 nm Next, an ultraviolet-curable resin was uniformly applied onto the second protective layer by a spin-coating method, and this was cured by being irradiated with ultraviolet light, thus forming a light-transmissive layer having a thickness of 0.1 mm. Thus, a target write-once optical recording medium of Example 1 was obtained.

Example 2

A write-once optical recording medium of Example 2 was obtained as in Example 1 except that the first protective layer was formed of SiN and the second protective layer was formed of ITO.

Comparative Example 1

A write-once optical recording medium of Comparative Example 1 was obtained as in Example 1 except that the first protective layer was formed of SiN and the second protective layer was formed of Al$_2$O$_3$.

Comparative Example 2

A write-once optical recording medium of Comparative Example 2 was obtained as in Example 1 except that the first protective layer was formed of SiN and the second protective layer was formed of AlN.

Comparative Example 3

A write-once optical recording medium of Comparative Example 3 was obtained as in Example 1 except that the first protective layer was formed of SiN and the second protective layer was formed of SiN.

(Evaluation of Storage Reliability)

Storage reliability of the write-once optical recording media of Examples 1 and 2 and Comparative Examples 1 to 3 obtained as described above was evaluated as follows. First, an error rate (symbol error rate) after 2-times speed recording was measured with the drive (BDR-101A) manufactured by Pioneer Corporation. Next, the write-once optical recording media were placed in a thermostatic chamber at 80° C. and 85% RH to perform an acceleration test. Subsequently, 200 hours, 400 hours, and 600 hours later from the start of the acceleration test, an error rate measurement the same as that described above was performed. The results are shown in FIG. 4.

Figure 4:
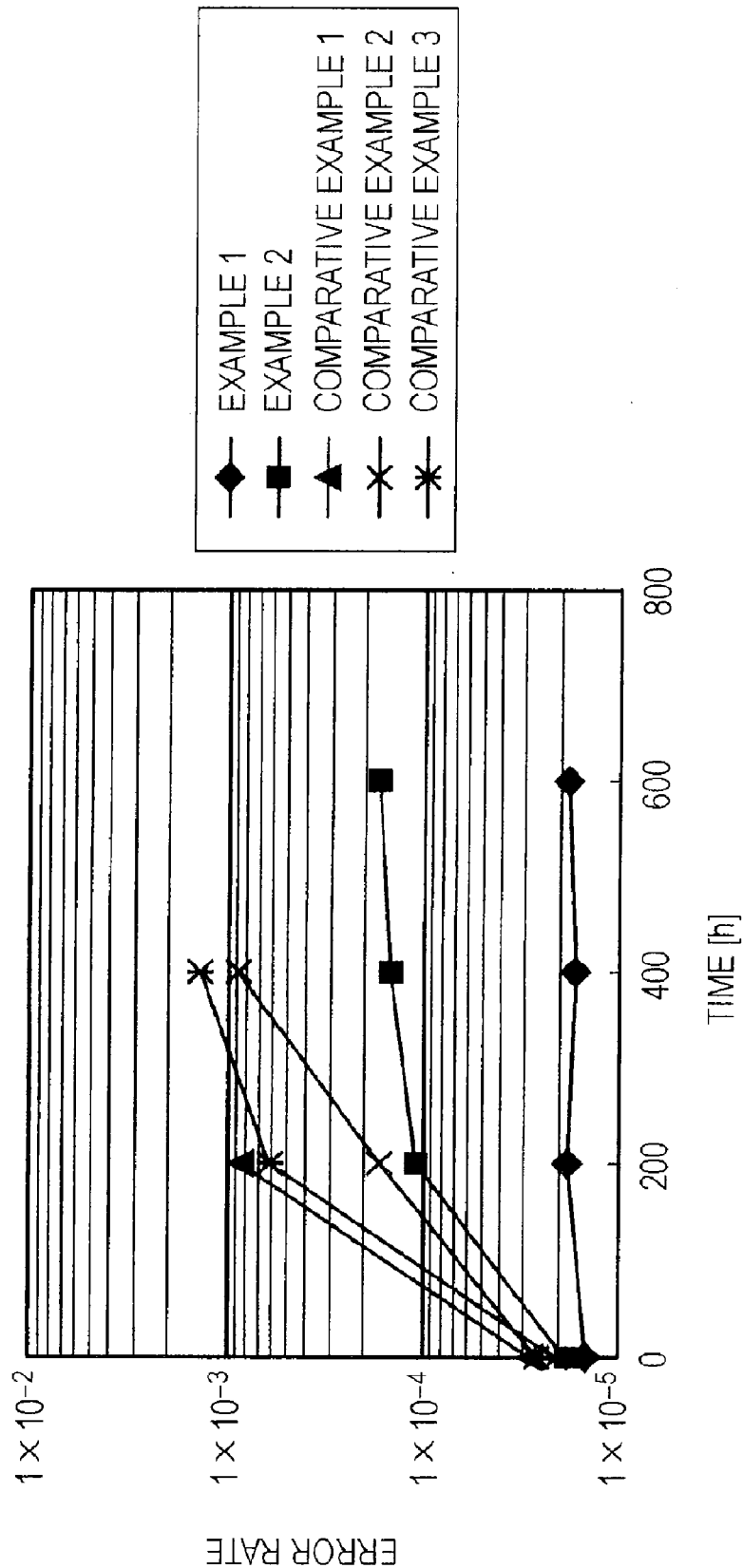
FIG. 4 is a graph showing storage reliability of write-once optical recording media of Examples 1 and 2 and Comparative Examples 1 to 3.

FIG. 4 shows the following.

Although the initial error rate is good regardless of the materials of the protective layers, the error rate after the storage test significantly varies depending on the materials of the protective layers. That is, whereas in Comparative Examples 1 to 3, in which both the first protective layer and the second protective layer are formed of any of the materials of SiN, $Al_2O_3$, and AlN, the error rate after the acceleration test significantly degrade, in Examples 1 and 2, in which at least one of the first protective layer and the second protective layer is formed of ITO, an increase in the error rate after the acceleration test is suppressed. In particular, in Example 2, in which both the first protective layer and the second protective layer are formed of ITO, an increase in the error rate after the acceleration test is significantly suppressed, and the error rate hardly increases even after 600 hours of the acceleration test.

Consequently, from the standpoint of an improvement of storage reliability, at least one of the first protective layer and the second protective layer is preferably formed of ITO, and both the protective layers are more preferably formed of ITO.

Examples 3-1 to 3-11

The thickness d1 of the first protective layer and the thickness d2 of the heat-accumulating layer were changed in each sample of Examples 3-1 to 3-3-11 so that when the thickness of the first protective layer is represented by d1 and the thickness of the heat-accumulating layer is represented by d2, the total thickness (d1+d2) of the first protective layer and the heat-accumulating layer is 26 nm and the first protective layer and the heat-accumulating layer satisfy the relationship of $0.00 \leq d2/(d1+d2) \leq 1.00$. Write-once optical recording media of Examples 3-1 to 3-11 were obtained as in Example 1 except for this.

(Evaluation of Jitter)

Figure 5:
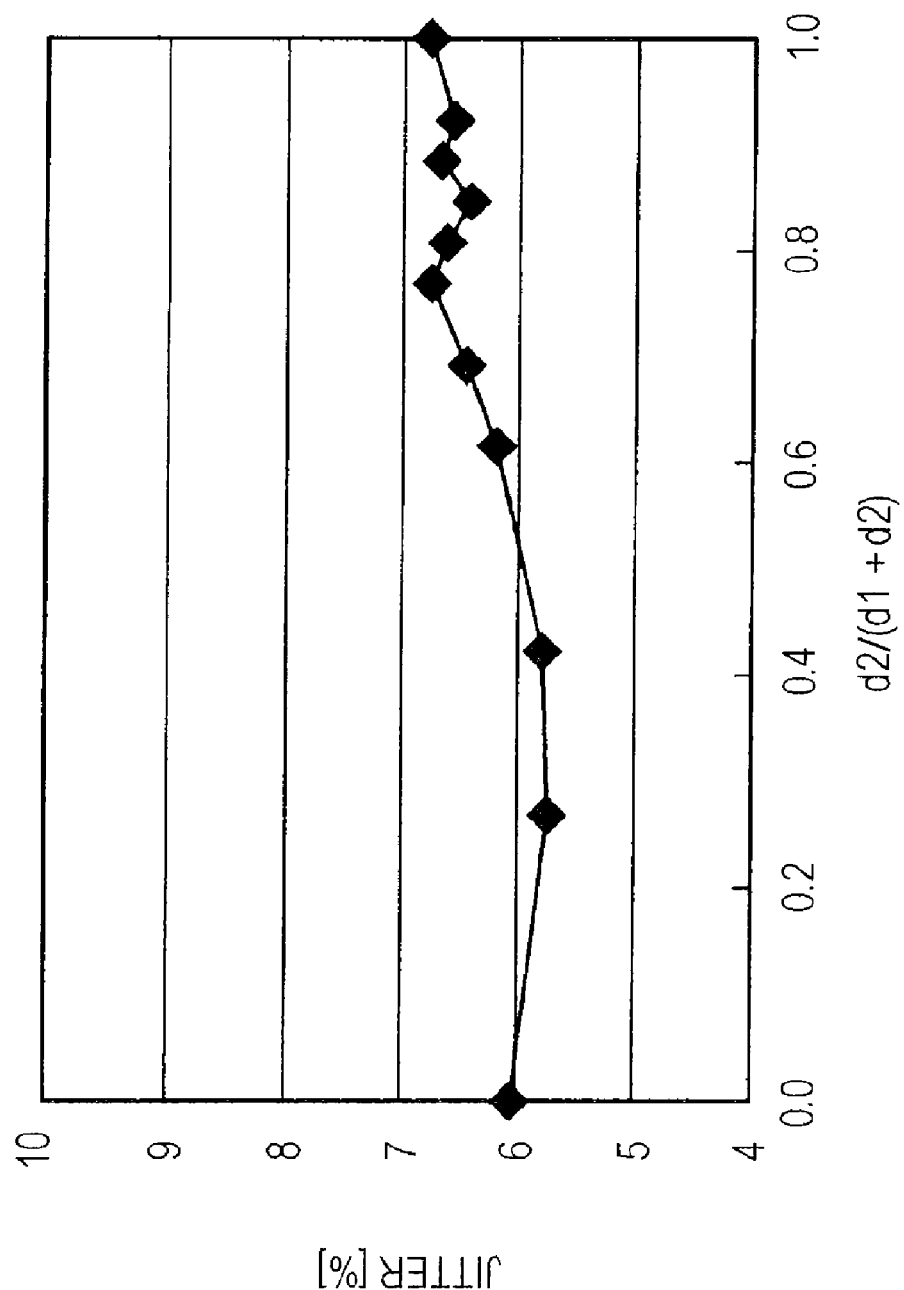
FIG. 5 is a graph showing jitter characteristics of write-once optical recording media of Examples 3-1 to 3-11.

Jitter values during 4-times speed recording of the write-once optical recording media of Examples 3-1 to 3-11 obtained as described above were measured as follows. The jitter was measured through an equalizer board manufactured by Pulstec Industrial Co., Ltd. using a time interval analyzer TA720 manufactured by Yokogawa Electric Corporation. The equalizer was compliant with the standard, and the jitter of a signal obtained after it passed through a limit equalizer was measured. The results are shown in FIG. 5.

(Evaluation of Recording Sensitivity)

Figure 6:
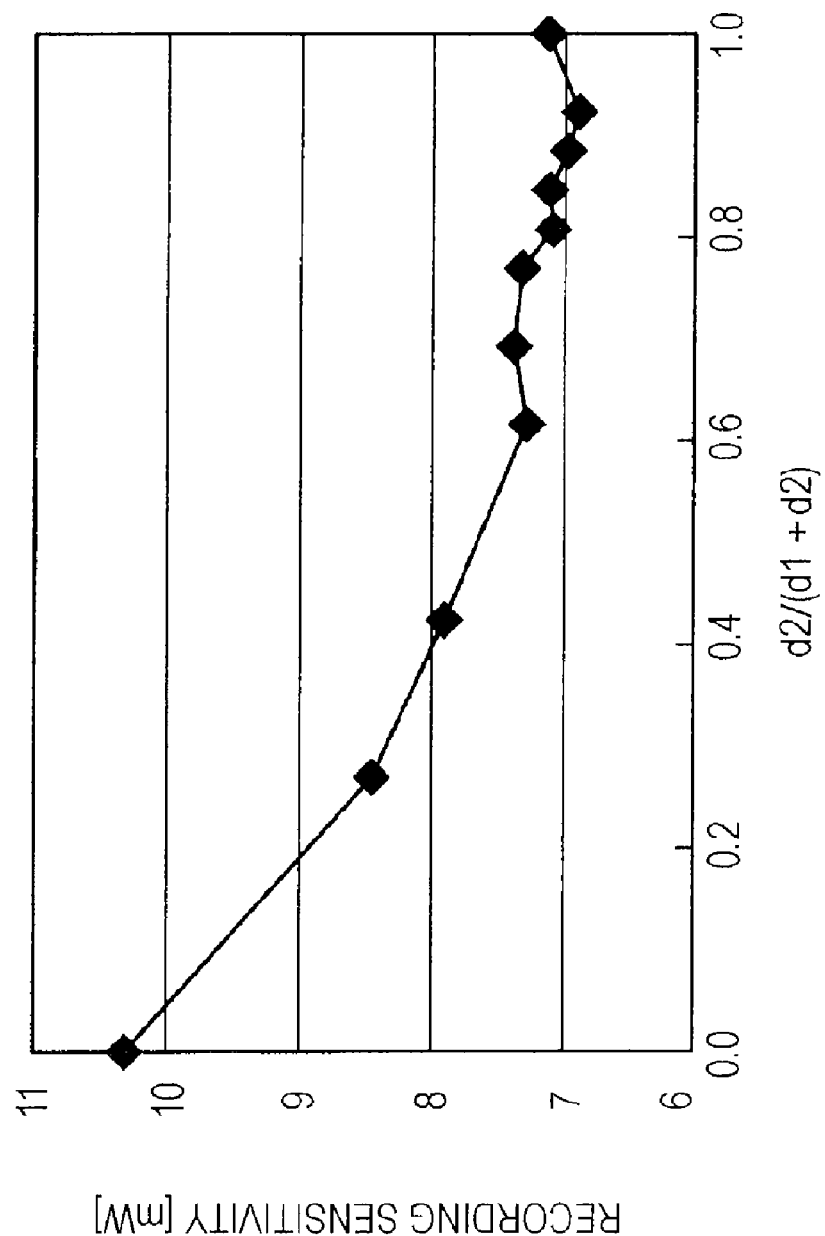
FIG. 6 is a graph showing recording sensitivity of the write-once optical recording media of Examples 3-1 to 3-11.

Recording sensitivities during 4-times speed recording of the write-once optical recording media of Examples 3-1 to 3-11 obtained as described above were determined as follows. A power sweep was performed from a low-power side to a high-power side. A value of ⅗ of a width of recording power values on the over-power side and the under-power side at which the jitter was 8.5% was defined as a recording sensitivity (optimum power). The results are shown in FIG. 6.

(Evaluation of Recording Power Margin)

Recording power margins during 4-times speed recording of the write-once optical recording media of Examples 3-1 to 3-11 obtained as described above were determined as follows. A jitter value of a signal obtained after it passed through a limit equalizer was measured while changing a recording power. A range of the recording power where the jitter value was 8.5% or less was defined as a margin of the recording sensitivity, and a value obtained by dividing the power range by the optimum power was defined as a power margin. The results are shown in FIG. 12.

FIG. 5 shows that the jitter characteristics hardly depend on the film-thickness balance between the first protective layer and the heat-accumulating layer, and suitable jitter characteristics satisfying the standard of a single-layer BD-R (7% or less) are obtained in any ratio.

FIG. 6 shows that the recording sensitivity increases as the proportion of the heat-accumulating layer increases. Even when the heat-accumulating layer is 0 nm, the recording sensitivity is 10.5 mW, which is the upper limit of the recording sensitivity at the 4-times speed defined by the standard of the BD-R, or less and thus satisfies the standard. However, it is desirable that the sensitivity be increased as much as possible in order that a margin is ensured as a system for an output power of a recording drive, and thus a heat-accumulating layer is preferably formed so as to be adjacent to at least one surface of the inorganic recording layer. Furthermore, in the case where the heat-accumulating layer is formed, it is preferable that the thickness d1 of the first protective layer and the thickness d2 of the heat-accumulating layer satisfy the relationship of $0.07 \leq d2/(d1+d2) \leq 1.00$.

Figure 12:
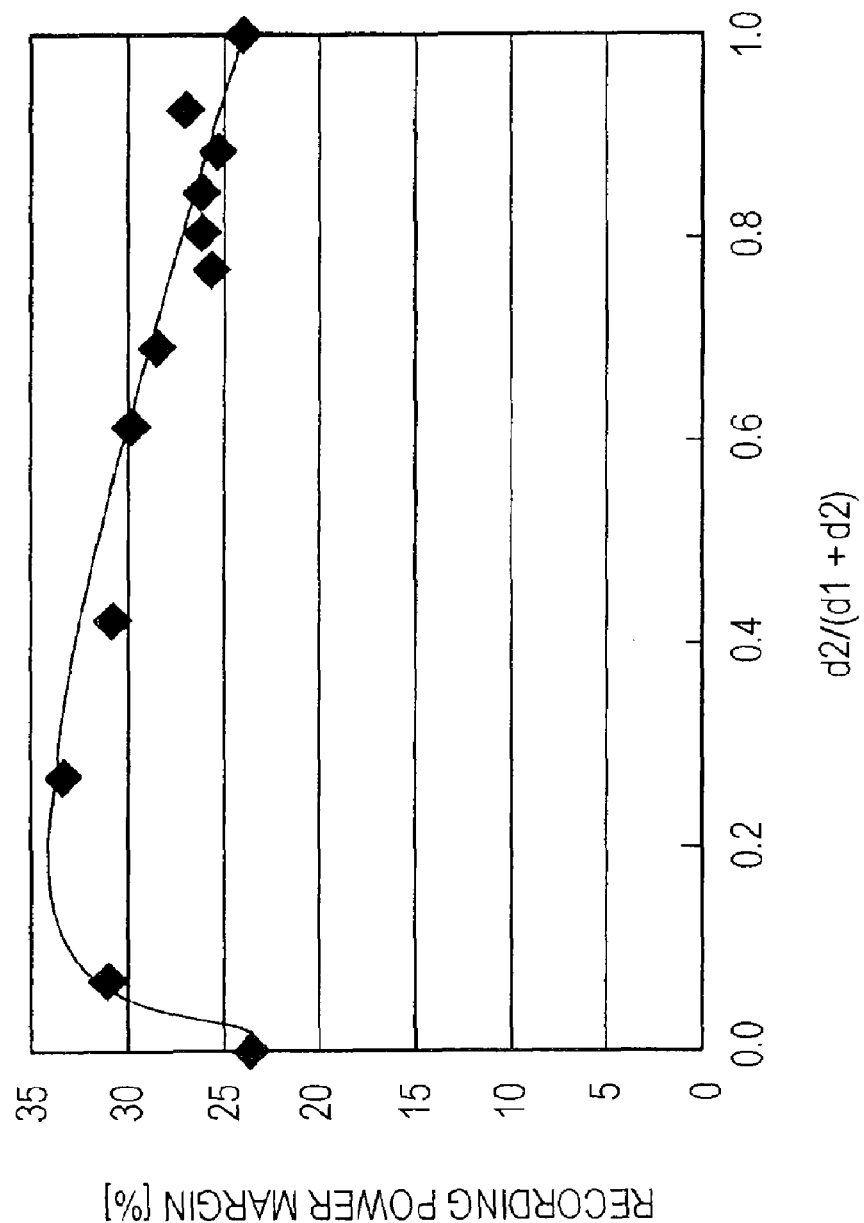
FIG. 12 is a graph showing a recording power margin of the write-once optical recording media of Examples 3-1 to 3-11.

FIG. 12 shows that the thickness d1 of the first protective layer and the thickness d2 of the heat-accumulating layer preferably satisfy the relationship of $0.07 \leq d2/(d1+d2) \leq 0.95$, and more preferably satisfy the relationship of $0.07 \leq d2/(d1+d2) \leq 0.60$.

Examples 4-1 to 4-10

Write-once optical recording media of Examples 4-1 to 4-10 were obtained as in Example 1 except that the thickness d of the second protective layer was changed in the range of 7 to 38 nm.

(Evaluation of Recording Power Margin)

Recording power margins during 4-times speed recording of the write-once optical recording media of Examples 4-1 to 4-10 obtained as described above were determined as follows. A jitter value of a signal obtained after it passed through a limit equalizer was measured while changing a recording power. A range of the recording power where the jitter value was 8.5% or less was defined as a margin of the recording sensitivity, and a value obtained by dividing the power range by the optimum power was defined as a power margin. The results are shown in FIG. 7.

Figure 7:
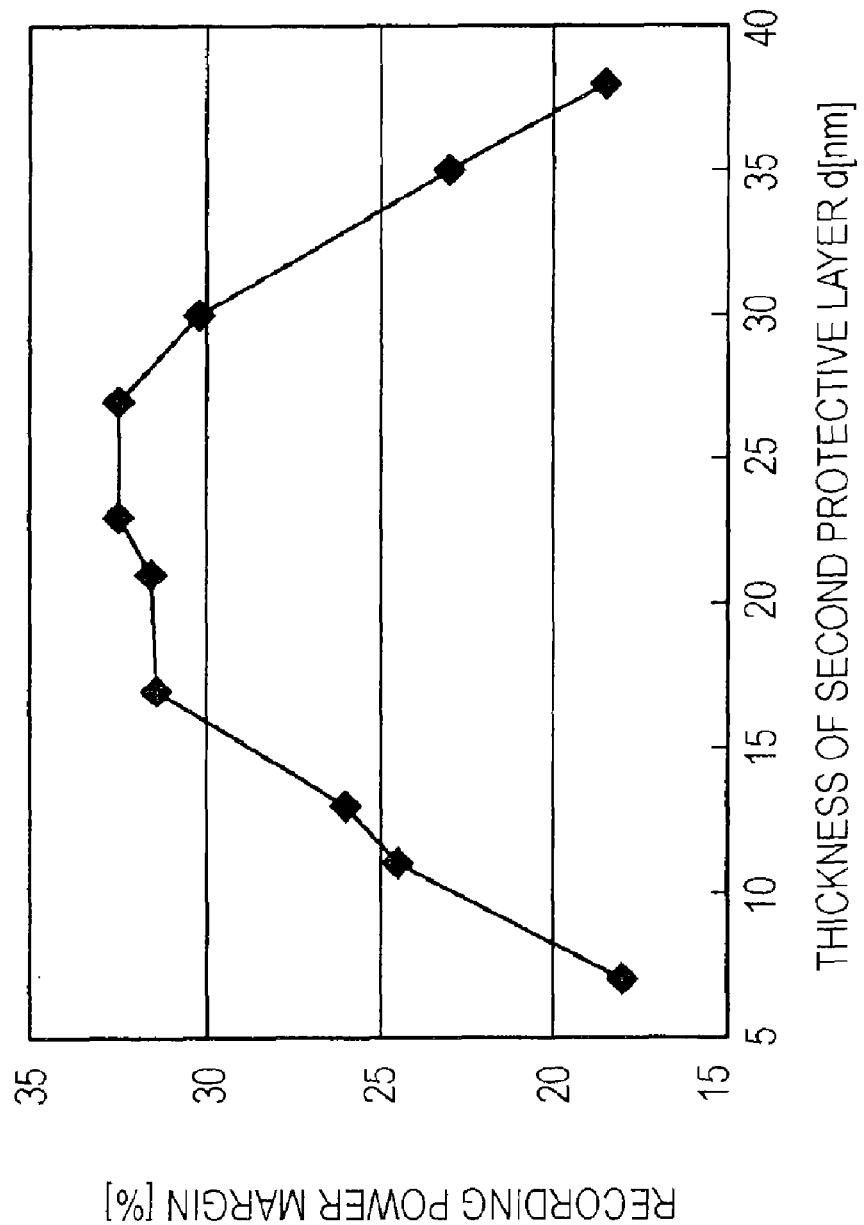
FIG. 7 is a graph showing a recording power margin of write-once optical recording media of Examples 4-1 to 4-10.

Referring to FIG. 7, it is confirmed that, in the range where the thickness d of the second protective layer is 11 to 34 nm, a recording power margin of 25%, which is recommended in the standard of the BD-R, is satisfied. Furthermore, considering even variations in the recording sensitivity over the entire surface of a disc, a range of 16 to 30 nm, in which a recording power margin of 30% can be ensured, is preferable.

Example 5

A write-once optical recording medium of Example 5 was obtained as in Example 1.

(Evaluation of Recording Power Margin)

Recording power margins during 4-times speed recording and 6-times speed recording of the write-once optical recording medium of Example 5 obtained as described above were determined as follows. A jitter value of a signal obtained after it passed through a limit equalizer was measured while changing a recording power. A range of the recording power where the jitter value was 8.5% or less was defined as a margin of the recording sensitivity, and a value obtained by dividing the power range by the optimum power was defined as a power margin. A change in the jitter value with respect to the recording power is shown in FIG. 8.

Figure 8:
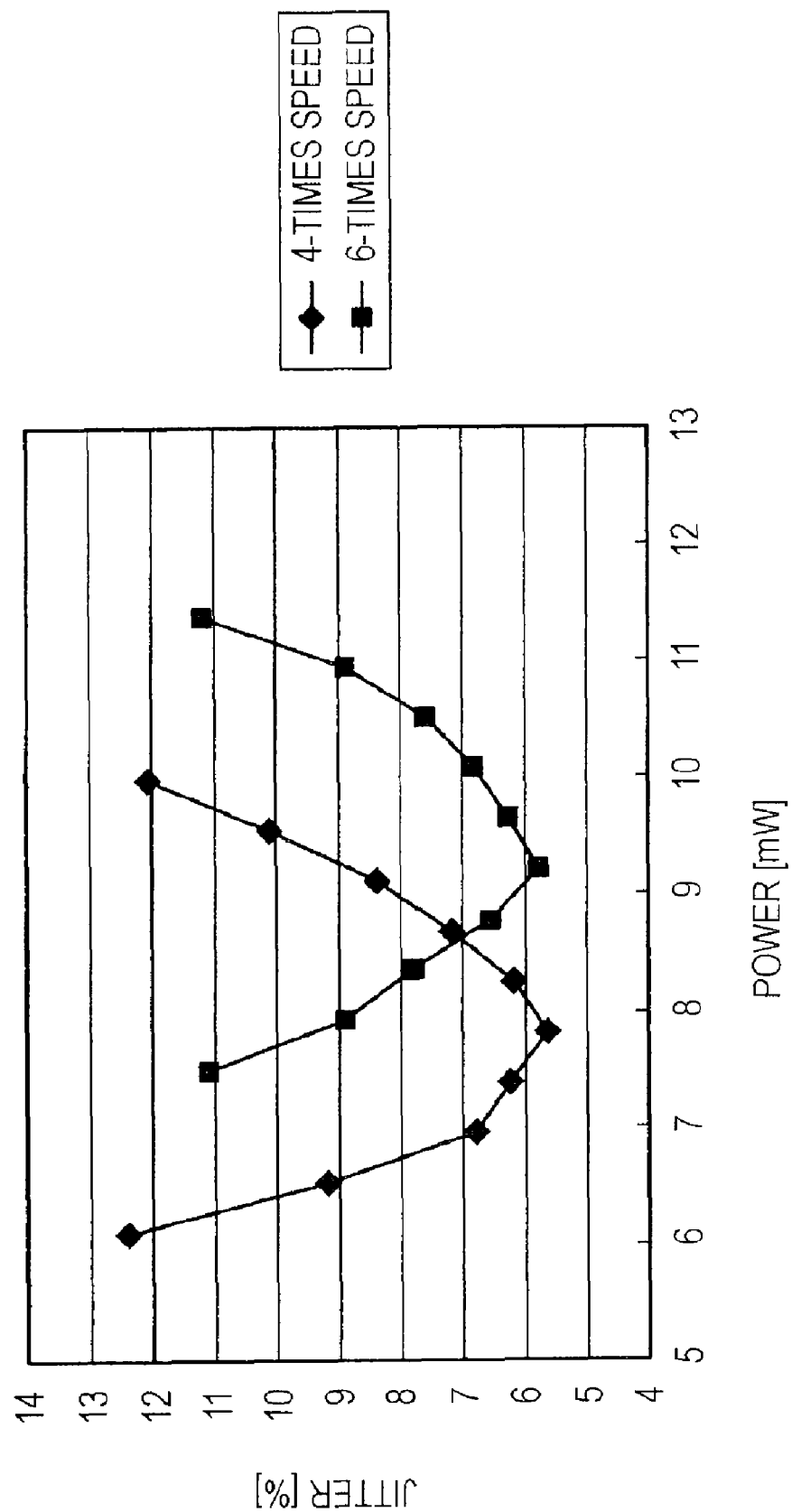
FIG. 8 is a graph showing jitter characteristics of a write-once optical recording medium of Example 5.

FIG. 8 shows that the change in the jitter value with respect to the recording power at the 6-times speed is substantially the same as that at the 4-times speed. As described above, it has been found that when an information signal is recorded at the 4-times speed, a recording power margin of 30% can be ensured (see FIG. 7). Since the change in the jitter value with respect to the recording power at the 4-times speed is substantially the same as that at the 6-times speed, it is believed that a recording power margin of about 30% can be ensured also in the case where an information signal is recorded at the 6-times speed (linear velocity 29.52 m/s). That is, it is found that the configuration of the write-once optical recording medium of the present invention can be satisfactorily compatible with a high-speed recoding in the future.

Test Example 1

Figure 9:
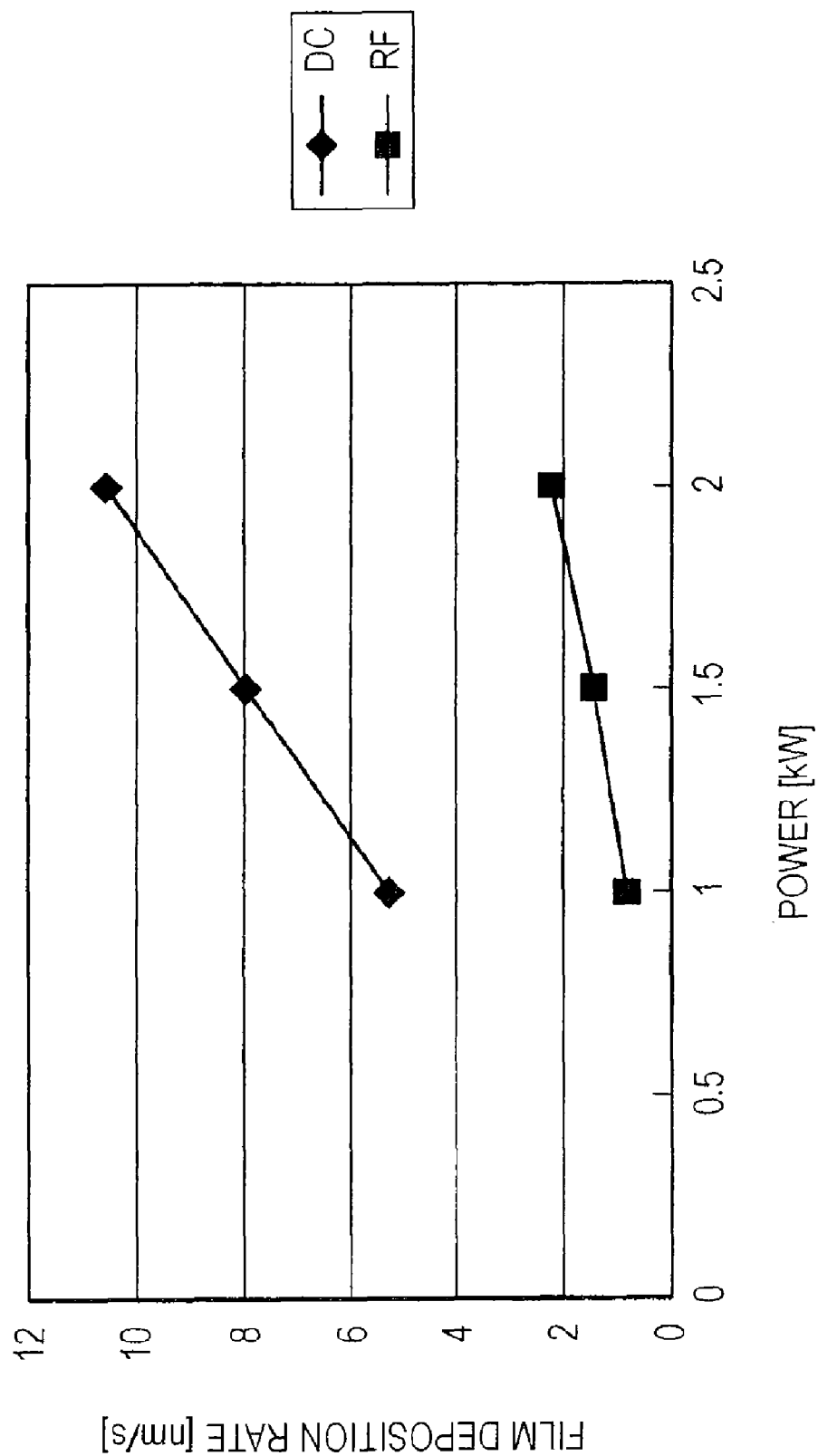
FIG. 9 is a graph showing a film deposition rate in film deposition methods of Test Examples 1 and 2.

An ITO film was deposited on a substrate by a DC sputtering method, and the film deposition rate thereof was determined. The results are shown in FIG. 9. Pinnacle plus+5 kW manufactured by Advanced Energy Industries, Inc. was used as a DC power supply, and a target having a diameter $\Phi$ of 200 mm and a thickness of 6 mm was used.

Test Example 2

An ITO film was deposited on a substrate by an RF sputtering method, and the film deposition rate thereof was determined. The results are shown in FIG. 9. Apex 1 to 5.5 kW Generator manufactured by Advanced Energy Industries, Inc. was used as an RF power supply, and a target having a diameter $\Phi$ of 200 mm and a thickness of 6 mm was used.

FIG. 9 shows that the film deposition rate with the DC power supply is higher than that with the RF power supply, and, for example, at a power of 2.0 kW, the film deposition rate by the DC sputtering method is higher than that by the RF sputtering method by about 4 times. That is, in the case where the DC sputtering method is employed in the deposition of a second protective layer composed of ITO, it is estimated that the second protective layer having a thickness of 20 nm can be deposited in one chamber for about 1.9 seconds. Even when a transfer time of a disc is included, a high-speed film deposition in which a film deposition takt is about 4 seconds can be realized. In general, in inorganic media, a dielectric film such as SiN or ZnS—$SiO_2$ is often designed to have a large thickness for controlling a flow of heat. This may become a bottleneck of the takt, thus decreasing productivity, and there are many cases where a high initial investment is necessary because a plurality of expensive RF power supplies are used during production. However, according to the film configuration of the Examples, each film can be deposited in a single chamber, and thus film deposition can be performed with a film deposition apparatus having a five-chamber structure. Accordingly, both high productivity and suppression in the initial investment for a production apparatus can be satisfied.

Example 6

First, a polycarbonate substrate having a thickness of 1.1 mm was formed by injection molding. Note that a projecting and recessed surface having in-grooves Gin and on-grooves Gon was formed on this polycarbonate substrate.

Next, a reflective layer, a first protective layer, an inorganic recording layer, a heat-accumulating layer, and a second protective layer were sequentially laminated on the polycarbonate substrate by a sputtering method. The specific configuration of each of the layers was as follows.

Reflective layer: Ag—Nd—Cu alloy (ANC), 40 nm
First protective layer: ITO, 10 nm
Inorganic recording layer: $(Te_{0.8}Pd_{0.2})_{0.5}O_{0.5}$, 11 nm
Heat-accumulating layer: ZnS—$SiO_2$, 20 nm
Second protective layer: ITO, 14 nm Next, an ultraviolet-curable resin was uniformly applied onto the second protective layer by a spin-coating method, and this was cured by being irradiated with ultraviolet light, thus forming a light-transmissive layer having a thickness of 0.1 mm. Thus, a target write-once optical recording medium of Example 6 was obtained.

(Evaluation of Recording Characteristics)

Recording characteristics during 4-times speed recording of the write-once optical recording medium of Example 6 obtained as described above were evaluated as follows. A jitter value of a signal obtained after it passed through a limit equalizer was measured while changing a recording power. The results are shown in FIG. 10.

Figure 10:
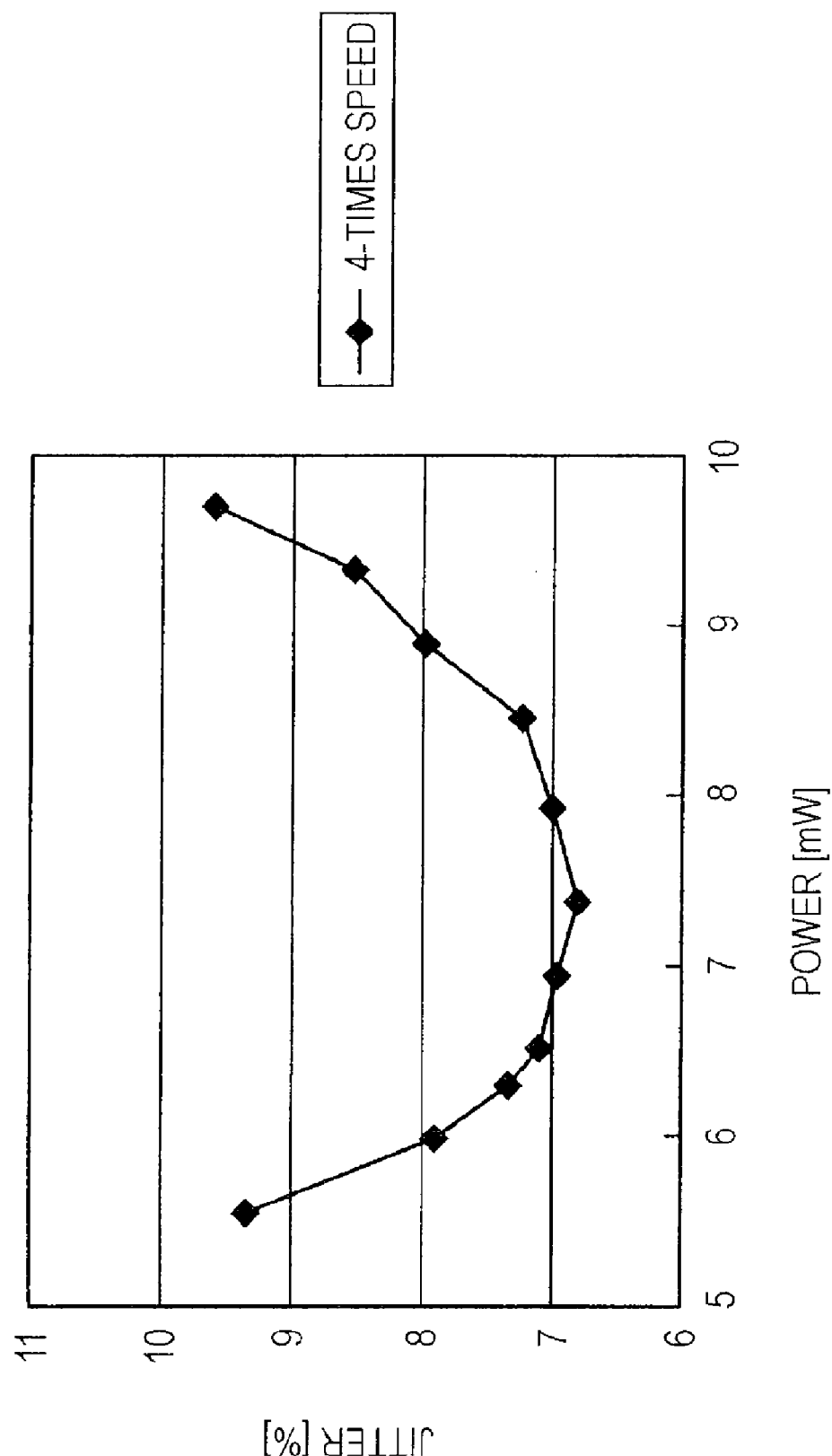
FIG. 10 is a graph showing recording characteristics of a write-once optical recording medium of Example 6.

FIG. 10 shows that, also in the inorganic recording layer containing $(Te_{0.8}Pd_{0.2})_{0.5}O_{0.5}$ as a main component, suitable recording characteristics can be obtained as in the inorganic recording layer containing ZnS, $SiO_2$, and Sb as main components.

Example 7

First, as in Example 1, a reflective layer, a first protective layer, a heat-accumulating layer, an inorganic recording layer, and a second protective layer were sequentially laminated on a substrate by a sputtering method. Next, an ultraviolet-curable resin was uniformly applied onto the second protective layer by a spin-coating method. Subsequently, a projection-and-recess pattern of a stamper was pressed onto the ultraviolet-curable resin that had been uniformly applied on the second protective layer, the ultraviolet-curable resin was cured by being irradiated with ultraviolet light, and the stamper was then detached. Thus, an interlayer having a thickness of 25 µm was formed.

Next, a first protective layer, an inorganic recording layer, a heat-accumulating layer, and a second protective layer were sequentially laminated on the interlayer by a sputtering method. The specific configuration of each of the layers was as follows.

First protective layer: ITO, 7 nm
Inorganic recording layer: $[(ZnS)_{80}(SiO_2)_{20}]_{40}Sb_{60}$, 10 nm
Heat-accumulating layer: ZnS—$SiO_2$, 11 nm
Second protective layer: ITO, 14 nm Next, an ultraviolet-curable resin was uniformly applied onto the second protective layer by a spin-coating method, and this was cured by being irradiated with ultraviolet light, thus forming a light-transmissive layer having a thickness of 0.1 mm. Thus, a target write-once optical recording medium of Example 7 was obtained. The results are shown in FIG. 11.

Figure 11:
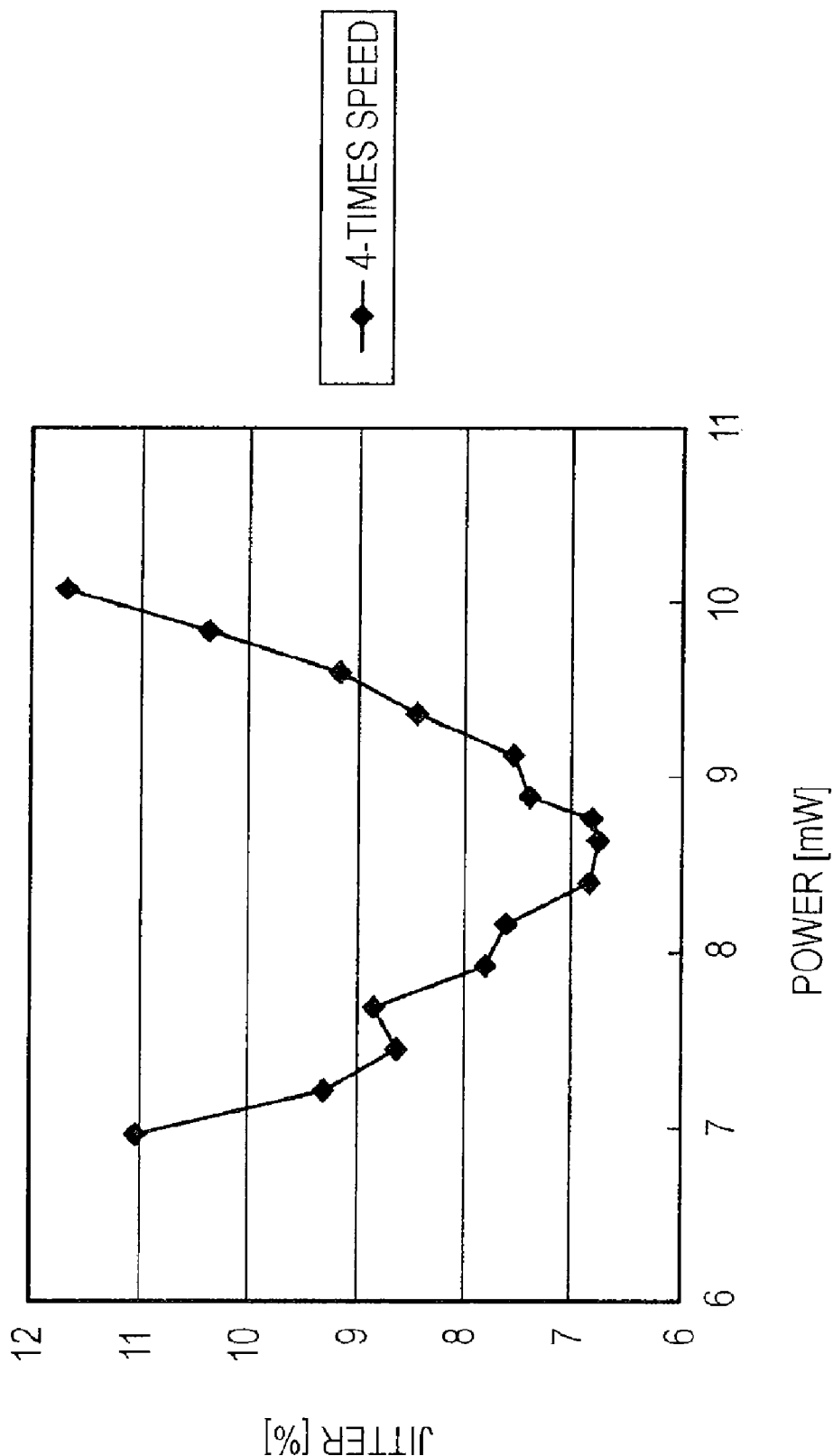
FIG. 11 is a graph showing recording characteristics of a write-once optical recording medium of Example 7.

FIG. 11 shows that, also in the case where a material containing ITO as a main component is used as the material of the first and second protective layers in an L1 layer, suitable recording characteristics can be obtained.

(Evaluation of Recording Characteristics)

Recording characteristics during 4-times speed recording of the write-once optical recording medium of Example 7 obtained as described above were evaluated. This evaluation of the recording characteristics was performed as in the above-described evaluation in Example 6.

Comparative Example 4-1

A write-once optical recording medium of Comparative Example 4-1 was obtained as in Example 7 except that a first protective layer, an inorganic recording layer, and a second protective layer which had the compositions and the film thicknesses described below were sequentially laminated on the interlayer.

First protective layer: ZnS—SiO$_2$, 7 nm
Inorganic recording layer: [(ZnS)$_{80}$(SiO$_2$)$_{20}$]$_{40}$Sb$_{60}$, 10 nm
Second protective layer: ZnS—SiO$_2$, 25 nm Comparative Examples 4-2 to 4-4 and Examples 8-1 to 8-3

Write-once optical recording media of Comparative Examples 4-2 to 4-4 and Examples 8-1 to 8-3 were obtained as in Comparative Example 4-1 except that the first protective layer and the second protective layer had the material compositions shown in Table 1.

Example 8-4

A write-once optical recording medium of Example 8-4 was obtained as in Example 1.

Evaluation of 1,000,000-Times Reproduction Power

A 1,000,000-times reproduction power of the write-once optical recording media of Examples 8-1 to 8-4 and Comparative Examples 4-1 to 4-4 obtained as described above were evaluated as follows. A change in the jitter was tracked while reproducing a portion recorded at the 4-times speed with three different powers, and the number of reproductions when the jitter reached 10% was plotted. A reproduction power with which the reproduction could be performed 1,000,000 times at a jitter of 10% or less was estimated by the Arrhenius plot. The results are shown in Table 1.

For example, when the first protective layer/second protective layer of the L1 layer were composed of ITO/ITO, the jitter reached 10% when the reproduction was performed at 1.25 mW 13,200 times, at 1.30 mW 3,700 times, and at 1.35 mW 1,100 times. These three points were Arrhenius-plotted to estimate a power with which the reproduction could be performed 1,000,000 times. The result thereof is "1.11 mW" shown in Table 1.

Considering reproduction durability in practical applications, it is preferable that the reproduction can be performed 1,000,000 times with an HF-modulation (high-frequency superposition) reproduction power of 0.60 mW during 1-time speed reproduction.

TABLE 1

| | First protective layer | Second protective layer | 1,000,000-times reproduction power [mW] |
|---|---|---|---|
| Comparative Example 4-1 | ZSS | ZSS | 0.72 |
| Comparative Example 4-2 | SiN | ZSS | 0.94 |
| Comparative Example 4-3 | Al$_2$O$_3$ | ZSS | 0.83 |
| Comparative Example 4-4 | AlN | ZSS | 0.81 |
| Example 8-1 | ITO | ZSS | 0.90 |
| Example 8-2 | ZSS | ITO | 1.01 |
| Example 8-3 | ITO | ITO | 1.11 |
| Example 8-4 | Single layer (L0 layer) | | 1.14 |

ZSS: ZnS—SiO$_2$

Table 1 shows the following.

Comparing the evaluation result of Example 8-3 having a two-layer structure with that of Example 8-4 having a single-layer structure, it is found that, in Example 8-3, reproduction durability substantially the same as that of Example 8-4 can be obtained. That is, it is found that, by using ITO as the materials of the first and second protective layers in the L1 layer, high reproduction durability can be obtained even when a semi-transmissive reflective film functioning as an area of heat dissipation is not provided in the L1 layer.

Attention is paid to the evaluation result of Comparative Example 4-1. It is found that when ZnS—SiO$_2$ is used as the materials of the first and second protective layers in the L1 layer, the 1,000,000-times reproduction power is 0.72 mW, which is a value of 0.60 mW of more, but a sufficient margin cannot be obtained for a system.

The reason for this is believed to be as follows. Since a semi-transmissive reflective film is not provided in the L1 layer, there is no area of heat dissipation. Therefore, when ZnS—SiO$_2$, which has a low thermal conductivity, is used as the materials of the protective layers (dielectric layers), data is degraded during repeated reproductions.

Attention is paid to the evaluation results of Comparative Examples 4-2 to 4-4. It is found that when materials other than ZnS—SiO$_2$ are used, an improvement in durability is observed. However, since the large thickness of the second protective layer is large; 25 nm, in view of productivity, ITO, which can be deposited by DC sputtering, is the most effective.

As described above, when at least one of the first protective layer and the second protective layer is formed of a material containing ITO as a main component, both high durability and productivity can be satisfied. Furthermore, when both the first protective layer and the second protective layer are formed of a material containing ITO as a main component, further improved durability and productivity can be obtained.

Example 9-1

A write-once optical recording medium of Example 9-1 was obtained as in Example 1 except that a reflective layer, a first protective layer, a heat-accumulating layer, an inorganic recording layer, and a second protective layer which had the compositions and the film thicknesses described below were sequentially laminated on a substrate.

Reflective layer: Ag—Nd—Cu alloy (ANC), 80 nm
First protective layer: ITO, 13 nm
Heat-accumulating layer: ZnS—SiO$_2$, 13 nm
Inorganic recording layer: [(ZnS)$_{80}$(SiO$_2$)$_{20}$]$_{40}$Sb$_{60}$, 20 nm
Second protective layer: ITO, 20 nm Examples 9-2 to 9-12

Write-once optical recording media of Examples 9-2 to 9-12 were obtained as in Example 1 except that a reflective layer, a first protective layer, a heat-accumulating layer, an inorganic recording layer, and a second protective layer which had the compositions and the film thicknesses described below were sequentially laminated on a substrate.

Reflective layer: Ag—Nd—Cu alloy (ANC), 80 nm
First protective layer: ITO, 12 nm
Heat-accumulating layer: ZnS—SiO$_2$, 11 nm
Inorganic recording layer: $[(ZnS)_{80}(SiO_2)_{20}]_{40}(Sb_{90}X_{10})_{60}$, 20 nm
Second protective layer: ITO, 20 nm Here, X included in the composition formula of the inorganic recording layer represents an additive (Ga, Te, V, Si, Zn, Ta, Ge, In, Cr, Sn, or Tb) shown in Table 2 below.

(Evaluation of Reflectivity)

Reflectivities of the write-once optical recording media of Examples 9-1 to 9-12 obtained as described above were evaluated. The results are shown in Table 2.

TABLE 2

|  | Additive | Reflectivity [%] |
| --- | --- | --- |
| Example 9-1 | Not contained | 15.8 |
| Example 9-2 | Ga | 18.7 |
| Example 9-3 | Te | 18.9 |
| Example 9-4 | V | 18.6 |
| Example 9-5 | Si | 17.8 |
| Example 9-6 | Zn | 18.4 |
| Example 9-7 | Ta | 17.3 |
| Example 9-8 | Ge | 17.9 |
| Example 9-9 | In | 17.6 |
| Example 9-10 | Cr | 19.0 |
| Example 9-11 | Sn | 17.7 |
| Example 9-12 | Tb | 18.1 |

Table 2 shows that the reflectivity of a write-once optical recording medium can be improved by incorporating any one of Ga, Te, V, Si, Zn, Ta, Ge, In, Cr, Sn, and Tb as an additive. Furthermore, from the standpoint of an improvement in the reflectivity, among the above elements, Ga, Te, V, Zn, Cr, and Tb are preferable, and Cr is the most preferable. In addition, the effect of improving the reflectivity can be similarly expected also in the case where two to more of the above elements are added.

As described above, from the standpoint of an improvement in the reflectivity, at least one element selected from the group consisting of Ga, Te, V, Si, Zn, Ta, Ge, In, Cr, Sn, and Tb is preferably incorporated in the inorganic recording layer, and at least one element selected from the group consisting of Ga, Te, V, Zn, Cr, and Tb is more preferably incorporated in the inorganic recording layer.

The numerical values, the materials, the structures, the shapes, and the like described in the above embodiments and Examples are merely exemplifications, and numerical values, materials, structures, and shapes different from those may be used according to need.

In addition, in the embodiments and Examples described above, a description has been made of examples in which the embodiment is applied to a write-once optical recording medium including a single inorganic recording film or two inorganic recording films. However, the embodiment can be applied also to a write-once optical recording medium having three or more inorganic recording films.

In addition, in the embodiments and Examples described above, cases where the present embodiment is applied to a write-once optical recording medium including an inorganic recording film and a light-transmissive layer disposed on the inorganic recording film wherein recoding or reproduction of an information signal is performed by irradiating the inorganic recording film with a laser beam from the light-transmissive layer side have been described as examples, but the present embodiment is not limited to this example. For example, the present invention can be applied also to a write-once optical recording medium including a substrate and an inorganic recording film disposed on the substrate wherein recoding or reproduction of an information signal is performed by irradiating the inorganic recording film with a laser beam from the substrate side or a write-once optical recording medium including bonded two substrates wherein recoding or reproduction of an information signal is performed by irradiating an inorganic recording film disposed between the substrates with a laser beam from a surface side of one of the substrates.

In addition, in the embodiments and Examples described above, cases where each layer of a write-once optical recording medium is formed by a sputtering method have been described as examples, but the method is not limited to this. Other film deposition methods may be employed. As the other film deposition methods, for example, in addition to CVD methods (chemical vapor deposition (chemical vapor deposition methods): techniques for depositing a thin film from a vapor phase utilizing a chemical reaction) such as thermal CVD, plasma CVD, and photo CVD; PVD methods (physical vapor deposition (physical vapor deposition methods): techniques for aggregating a material that is physically vaporized in a vacuum on a substrate to form a thin film) such as vacuum evaporation, plasma-assisted evaporation, sputtering, and ion plating; and the like can be employed.

In addition, in the embodiments and Examples described above, cases where the present embodiment is applied to a write-once optical recording medium have been described as examples, but the present embodiment can be applied also to a rewritable optical recording medium. However, in the case where the present embodiment is applied to a write-once optical recording medium, the effects of improving reliability and improving the power margin are larger.

In addition, in the embodiments and Examples described above, a description has been made of examples in which the present embodiment is applied to a write-once optical recording medium including protective layers disposed on both sides of an inorganic recording layer, but the present embodiment can be applied also to a write-once optical recording medium including a protective layer disposed on one side of an inorganic recording layer. That is, a protective layer containing indium oxide and tin oxide as main components may be provided on one side of an inorganic recording layer.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

| Explanation of Reference Numerals | |
| --- | --- |
| 1 | substrate |
| 2 | reflective layer |
| 3, 11 | first protective layer |
| 4, 12 | inorganic recording layer |
| 5, 13 | second protective layer |
| 6 | light-transmissive layer |
| 7 | heat-accumulating layer |
| 8 | interlayer |

Explanation of Reference Numerals

| | |
|---|---|
| 10 | write-once optical recording medium |
| 1a | projecting and recessed surface |
| L1 | first recording layer (L0 layer) |
| L2 | second recording layer (L1 layer) |
| Gin | in-groove |
| Gon | on-groove |

The invention claimed is:

1. A write-once optical recording medium comprising:
an inorganic recording layer;
a protective layer containing indium oxide and tin oxide as main components, the protective layer being provided on at least one surface of the inorganic recording layer; and
a heat-accumulating layer provided on at least one surface of the inorganic recording layer,
wherein the inorganic recording layer is adjacent to the heat-accumulating layer, and
wherein the inorganic recording layer contains ZnS, $SiO_2$, and Sb as main components.

2. The write-once optical recording medium according to claim 1, wherein the heat-accumulating layer contains ZnS and $SiO_2$ as main components.

3. The write-once optical recording medium according to claim 1, wherein when a thickness of the protective layer is represented by d1 and a thickness of the heat-accumulating layer is represented by d2, and these thicknesses d1 and d2 satisfy the relationship of $0.07 \leq d2/(d1+d2) \leq 1.00$.

4. The write-once optical recording medium according to claim 1, wherein the protective layer is provided on, among the surfaces of the inorganic recording layer, a surface on which a laser beam for recording and/or reproduction is incident, and
a thickness of the protective layer is 11 nm or more and 34 nm or less.

5. The write-once optical recording medium according to claim 1, wherein the inorganic recording layer contains at least one element selected from the group consisting of Ga, Te, V, Si, Zn, Ta, Ge, In, Cr, Sn, and Tb.

6. The write-once optical recording medium according to claim 1, wherein the inorganic recording layer has a composition satisfying formula (I) below:

$$[(ZnS)_x(SiO_2)_{1-x}]_y(Sb_zX_{1-z})_{1-y} \quad (1)$$

wherein $0 < x \leq 1.0$, $0.3 \leq y \leq 0.7$, and $0.8 < z \leq 1.0$, and X is at least one element selected from the group consisting of Ga, Te, V, Si, Zn, Ta, Ge, In, Cr, Sn, and Tb.

7. The write-once optical recording medium according to claim 1, wherein a thickness of the inorganic recording layer is 3 nm or more and 40 nm or less.

8. A method of manufacturing a write-once optical recording medium comprising:
forming an inorganic recording layer; and
forming a protective layer containing indium oxide and tin oxide as main components,
wherein the protective layer is provided on at least one surface of the inorganic recording layer, and
in forming the protective layer, the protective layer is formed by a direct-current sputtering method, and
wherein the inorganic recording layer contains ZnS, $SiO_2$, and Sb as main components.

* * * * *